W. H. & G. W. MILLER.

Manufacture of Blades of Pocket-Cutlery.

No. 6,195. Reissued Dec. 29, 1874.

Witnesses.
Edwd D. Briggs.
C. E. Buckland.

Inventors
William H. Miller.
George W. Miller.
By J. Mentis.
their atty.

THE GRAPHIC CO. PHOTO-LITH. 39 & 41 PARK PLACE, N.Y.

UNITED STATES PATENT OFFICE.

WILLIAM H. MILLER AND GEORGE W. MILLER, OF MERIDEN, CONNECTICUT, ASSIGNORS TO THE MILLER BROTHERS CUTLERY COMPANY.

IMPROVEMENT IN THE MANUFACTURE OF BLADES OF POCKET-CUTLERY.

Specification forming part of Letters Patent No. 106,073, dated August 2, 1870; reissue No. 6,195, dated December 29, 1874; application filed October 12, 1874.

*To all whom it may concern:*

Be it known that we, WILLIAM H. MILLER and GEORGE W. MILLER, of Meriden, in the county of New Haven and State of Connecticut, have invented a new and useful Improvement in Dies for Forging Blades of Pocket-Cutlery; and we do hereby declare that the following is a full, clear, and exact description thereof, reference being had to the accompanying drawings, making a part of this specification, and to the letters of reference marked thereon, in which—

Figure 1:
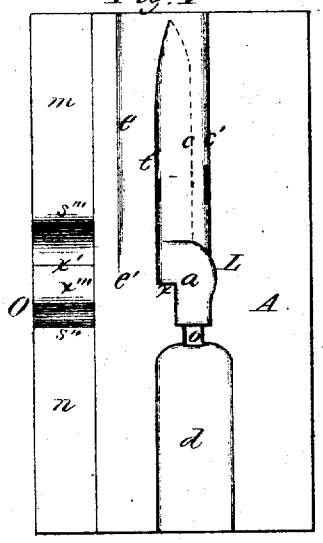
Figure 4:
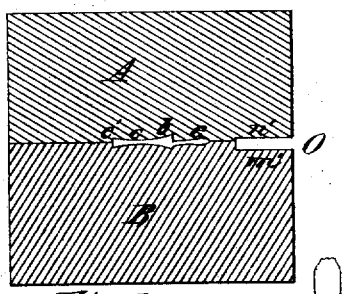
Figure 2:
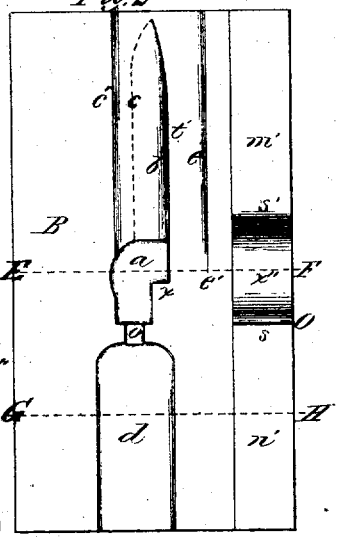
Figure 7:
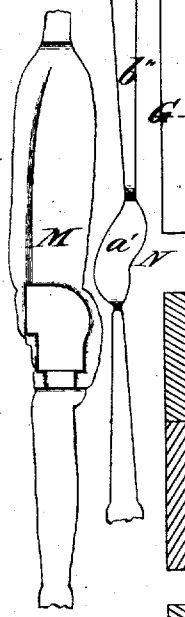
Figure 3:
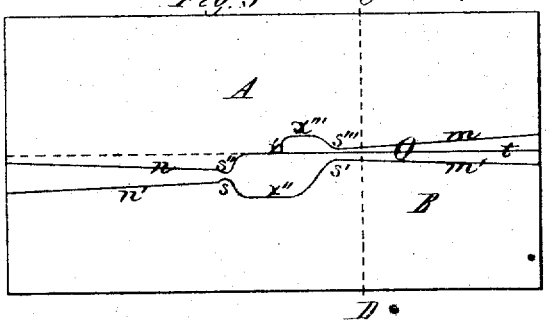
Figure 5:
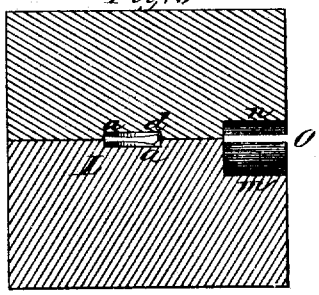
Figure 8:
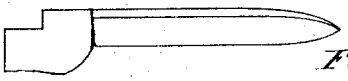
Figure 6:
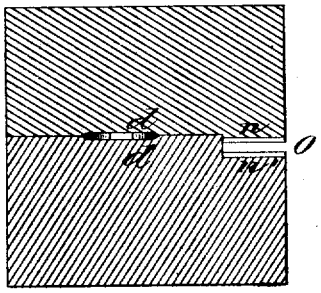

Figure 1 is a plan view of one-half the dies when made together. Fig. 2 is a plan view of the other half. Fig. 3 is a side view of the break-down die. Fig. 4 is a vertical transverse section of both dies when placed together, through line C D of Fig. 3. Fig. 5 is a vertical transverse section of the same through line E F of Fig. 2. Fig. 6 is a vertical transverse section of the same through line G H of Fig. 2. Fig. 7, N is a side view of a blank after being operated upon by the break-down die O, and M is a plan view of the same piece after being operated upon by the die L; and Fig. 8 is a side view of a blade after being operated upon by the die L, and the burr removed and the blade separated from the bar.

Our invention relates to the manufacture of blades for pocket-cutlery; and it consists of two dies or pairs of dies, which may be used in connection with each other, one of the said dies or pairs of dies being used to prepare the bar for its final shape by pressing the metal together for the purpose of bringing the stock more at that point where it is most needed in the manufacture of the blade. The other die or pair of dies is used to give the desired shape or form to the blade and its heel, the operations in either set of dies being performed while the metal is properly heated, and pressure applied to the dies while the bar of metal is held within them. The object of our invention is to enable the manufacturer to form the blades of pocket-cutlery with as little manipulation of the metal as possible, and yet not be obliged to use bars of metal of such size as to incur too much waste in their manufacture, thus saving time, labor, and expense in the operation.

To enable others skilled in the art to make and use our invention, we will proceed to describe the same and its application to use.

In the drawing, A and B represent two blocks of metal, which, for convenience of using them, contain the two dies required for this operation of converting a portion of a bar of steel into a blank pocket-knife blade; and although the dies are in two parts—that is, one-half of the die is in one block, A, and the other half in the block B—I denominate the halves one die, inasmuch as both halves are necessary to give the required form to the metal. One of these dies I denominate the "break-down," as its purpose is to break down or depress the metal, and crowd it together in certain places, making the bar thicker in some parts and smaller in others, and this break-down die is represented upon the side of the blocks A and B at O. The form of this die is shown more fully in Fig. 3, in which $x''$ is a recess terminating at each end of the recess in the elevated points $s$ and $s'$, the point $s'$ being the highest, and from these two points the planes $n'$ and $m'$ extend, inclining downward as they approach the ends of the block B. In the block A is another recess, $x'''$, opposite the one in the block B, and terminating in the ridges $s''$ and $s'''$, and in said recess $x'''$ is a protuberance, $x'$. From these ridges $s''$ and $s'''$ the planes $n$ and $m$ extend, one each way, and incline upward as they approach the ends of the block A. The depressions $x''$ and $x'''$ and the protuberance $x'$, when the blocks A and B are placed together, form a recess which somewhat resembles and approximates in its form the heel of the knife-blade, or the cavity $a$ in the die L. The line $t$ in Fig. 3 represents the line of division between the blocks A and B.

In practice one of the blocks is set firmly into a solid position, while the other is fixed in a position to move downward upon the first; and if a bar of metal be heated and placed lengthwise in the die O thus described, the ridges or parts $s$ and $s''$, and also $s'$ and $s'''$, approach nearer to each other than at any other part of the metal of that die, and the metal is pressed harder at those points, and is forced back each way, a part being crowded back into the recess at $x''$ and $x'''$, while the space between the planes $n$ and $n'$ on one side the recess, and the planes *m* and *m'* on the other, being widest at the outer ends, the metal is forced toward the ends, and assumes the form of the die O, and the metal, in a bar of uniform size, is forced, by this process, into those parts of the bar where it is required to have the largest quantity of stock, and without the longer process of hand-forging now practiced.

This operation of breaking down the metal brings it into the form shown in Fig. 7 at N, wherein the metal at *a'*, is pressed or forced into the proper form and in the right quantity to fill the parts *a* in the die L, which forms the heel of the blade. The part *b''* of the blank N also contains about the right quantity of metal to form the blade, by pressure, in the die L. The cavity *d* is made in the blocks A and B, and forming a part of the die L, and is made so shallow as to press the bar of metal very thin when placed therein. The size of this cavity *d*, when the parts A and B of the die are placed together, is shown more fully in Fig. 6; and when the bar of metal has been pressed in this part of the die, it is then in better shape to be drawn out into the proper form for the blade by the break-down die O hereinbefore described. The cavity *a* is flat at its base, and is of the proper size and shape to form the entire heel of the blade, and is shown in cross-section in Fig. 5. The cavity *b* is made one-half in one block, A, and the other half in the other block, B, the part *b'* being that part of the die which forms the blade at its thickest or heaviest part along the back. The part along the dotted line *c* is made more shallow, while the part at *c'*, from the part *a* to the end of the die, is made a little deeper, to allow room for the waste stock when the pressure is applied to the metal in the die; and a shallow cavity is also made at *e*, extending from the point *e'* to the outer end of the die. This cavity also allows room for the waste stock of the blade when pressure is applied to the metal in the die. The edges *t'* of the cavity *b* may be beveled in such portions as are desirable, to give the proper bevel to the back and point of the blade. That part of the die L which is thus described, and which forms the blade, is shown in cross-section in Fig. 4. No shallow cavities are required around the part *a* of the die L, as it is designed that as little waste stock should be left projecting from the heel of the blade in the blank as possible, while it is desirable that the blade should be left a little thicker in the blank than in the finished blade, in order to have sufficient metal to operate upon successfully in the process of tempering the blade, and in giving it its final finish. The small cavity *o* is made merely to give sufficient metal at that point to hold the blank blade to the rod in punching off the waste stock or burr from the blade.

Fig. 8 represents a blade after the waste stock or burr has been removed, which may be done by means of a die and counter-die of the desired shape of the blade. It will be perceived that by this operation the whole process of forming the blade of a pocket-knife is confined or limited to three simple operations or movements of a die, while the small amount of time required to form each, and the facility with which any number of blades of any desired style or pattern may be produced, without the least variation, render this a very advantageous one over the old and ordinary process of forging the blades by hand.

Having thus described our invention, what we claim as new, and desire to secure by Letters Patent, is—

1. For the forging of bars in the manufacture of blades of pocket-cutlery, the die O, by means of which the metal in the bar is gathered or pressed into that part of the bar where the most stock is required to form the heaviest part of the blade, substantially as described.

2. For giving form to the blades of pocket-cutlery, the die L, by means of which the blade and its heel are forged into their final shape by being submitted to pressure in said die preparatory to being trimmed, substantially as herein set forth.

WILLIAM H. MILLER.
GEORGE W. MILLER.

Witnesses:
ORVILLE H. PLATT,
C. P. IVES.